United States Patent [19]
Dinnage et al.

[11] Patent Number: 5,435,958
[45] Date of Patent: Jul. 25, 1995

[54] METHOD FOR MAKING A HUMIDITY EXCHANGER MEDIUM

[75] Inventors: Paul A. Dinnage, Kingston, N.H.; Gerard Tremblay, Lowell, Mass.

[73] Assignee: Munters Corporation, Amesbury, Mass.

[21] Appl. No.: 249,058

[22] Filed: May 25, 1994

Related U.S. Application Data

[62] Division of Ser. No. 100,144, Aug. 2, 1993.

[51] Int. Cl.⁶ ...................... B29D 16/00; B01D 29/07
[52] U.S. Cl. ........................................ 264/171; 55/523; 55/524; 55/527; 55/DIG. 5; 96/153; 96/154; 156/210; 264/258; 264/DIG. 48; 502/439
[58] Field of Search ................... 96/153, 154; 95/117, 95/285; 264/DIG. 48, 171, 257, 258, 339; 55/523, 524, 528, 527, DIG. 5; 156/210; 428/116–118, 186, 429, 447; 502/439

[56] References Cited

U.S. PATENT DOCUMENTS

| | | | |
|---|---|---|---|
| Re. 30,575 | 4/1981 | Norback | 156/210 |
| 2,698,062 | 12/1954 | Veltman et al. | 95/117 |
| 2,980,558 | 4/1961 | Dempcy et al. | 117/152 |
| 3,307,617 | 3/1967 | Munters | 165/10 |
| 3,329,481 | 7/1967 | Young | 423/333 |
| 3,499,788 | 3/1970 | Glav | 427/243 |
| 3,499,812 | 3/1970 | Glav | 156/210 |
| 3,726,706 | 4/1973 | Glav | 117/62 |
| 3,782,081 | 1/1974 | Munters | 55/278 |
| 3,807,149 | 4/1974 | Norback | 55/388 |
| 4,021,590 | 5/1977 | Vangbo | 428/186 |
| 4,025,668 | 5/1977 | Norback | 427/227 |
| 4,036,597 | 7/1977 | Filss | 55/232 X |
| 4,162,934 | 7/1979 | Norback | 162/155 |
| 4,255,171 | 3/1981 | Dravnieks | 96/125 |
| 4,358,575 | 11/1982 | Lampe et al. | 428/429 X |
| 4,391,616 | 7/1983 | Imamura | 96/125 |
| 4,534,775 | 8/1985 | Frazier | 55/524 X |
| 4,717,769 | 1/1988 | Sato et al. | 540/536 |
| 4,853,292 | 8/1989 | Kuznicki | 423/326 |
| 4,871,607 | 10/1989 | Kuma et al. | 428/186 |
| 4,886,769 | 12/1989 | Kuma et al. | 502/62 |
| 4,911,775 | 3/1990 | Kuma et al. | 156/208 |
| 4,938,939 | 7/1990 | Kuznicki | 423/326 |
| 5,011,591 | 4/1991 | Kuznicki | 208/46 |
| 5,021,392 | 6/1991 | Daly et al. | 502/439 |
| 5,082,820 | 1/1992 | Mitsui et al. | 502/439 X |
| 5,194,414 | 3/1993 | Kuma | 96/153 X |
| 5,206,202 | 4/1993 | Lachman et al. | 502/439 X |
| 5,207,734 | 5/1993 | Day et al. | 96/154 X |

FOREIGN PATENT DOCUMENTS

WO85/04855 11/1985 WIPO.
WO85/04856 11/1985 WIPO.

*Primary Examiner*—Richard L. Chiesa
*Attorney, Agent, or Firm*—Fitzpatrick, Cella, Harper & Scinto

[57] ABSTRACT

The humidity exchanger medium is manufactured by forming a laminate of (i) a corrugated sheet and (ii) a flat sheet bonded to points of contact of a ridged surface of the corrugated sheet, the laminate having been impregnated with sodium silicate waterglass and then partially dried, each corrugated and flat sheet constituted of a paper of inorganic fibers; forming a honeycomb matrix from at least one laminate; soaking the honeycomb matrix in an acidic solution containing at least a titanium inorganic salt to convert the sodium silicate waterglass to a titanium-containing silicate hydrogel; and washing and drying the honeycomb matrix to convert the titanium-containing silicate hydrogel to a titanium-containing silicate aerogel.

14 Claims, 2 Drawing Sheets

METHOD FOR MAKING A HUMIDITY EXCHANGER MEDIUM

This application is a division of pending application Ser. No. 08/100,144 filed Aug. 2, 1993.

BACKGROUND OF THE INVENTION

1. Field of the Invention

The present invention relates to a humidity exchanger capable of providing dehumidified gas, such as dry air, continuously by passing gas through a humidity exchanger element which has a solid adsorbent capable of reversibly absorbing humidity. A humidity exchanger medium is made by including a specific metal in a silicate aerogel formed on a honeycomb matrix of inorganic fiber papers.

2. Description of the Prior Art

In U.S. Pat. Nos. 4,871,607, 4,886,769 and 4,911,775 humidity exchangers are formed from silica or silica-alumina type aerogels impregnated on a laminate of corrugated paper and flat liner paper in the form of a rotary or block honeycomb matrix. As described in U.S. Pat. No. 4,911,775, ceramic fiber papers may be soaked in a waterglass solution, suitably dried, adhered together and then appropriately corrugated to form a laminated corrugated sheet. The laminated sheet is wound or stacked to form a honeycomb matrix which is then sequentially treated with a waterglass solution and an aluminum salt to form an aluminum silicate hydrogel. The honeycomb is then washed and dried to form an aerogel from the hydrogel.

Crystalline titanium silicate molecular sieve zeolites of large and small pore sizes have been disclosed in U.S. Pat. Nos. 4,853,202, 4,938,939 and 5,011,591. Such crystalline materials are expensive, difficult to make, difficult to uniformly incorporate into dehumidifying elements and are not readily regenerated after use.

Accordingly, to further improve the efficiency of humidity exchangers it has been desired to enhance the moisture absorption rate of the aerogel, while reducing the energy required to regenerate the gel matrix after dehumidification use.

SUMMARY OF THE INVENTION

It is an object of the present invention to provide a humidity exchanger which has enhanced absorption efficiency and is more readily regenerated after use.

It is also an object to improve the process to manufacture a humidity exchanger.

The above and other objects are met in a humidity exchanger element comprising:
(a) a corrugated sheet;
(b) a flat sheet laminated to points of contact of a ridged surface of said corrugated sheet, each said corrugated and flat sheet constituted of a paper of inorganic fibers; and
(c) an adsorbent comprising an aerogel bonded to surfaces of each said sheet and impregnated on said inorganic fibers, said aerogel comprising a silicate of titanium or titanium- aluminum.

A humidity exchanger medium is formed of a bonded honeycomb matrix of wound or stacked sheets of the humidity exchanger element.

As employed herein, the term "partially dried" refers to a laminate having a solids content of waterglass between about 45–55% based on total weight of impregnated waterglass.

The humidity exchanger medium is manufactured by
(a) forming a laminate of (i) a corrugated sheet and (ii) a flat sheet bonded to points of contact of a ridged surface of said corrugated sheet, said laminate having been impregnated with sodium silicate waterglass and then partially dried, each said corrugated and flat sheet constituted of a paper of inorganic fibers;
(b) forming a honeycomb matrix from at least one said laminate;
(c) soaking said honeycomb matrix in an acidic solution containing at least a titanium inorganic salt to convert said sodium silicate waterglass to a titanium-containing silicate hydrogel; and
(d) washing and drying said honeycomb matrix to convert the titanium-containing silicate hydrogel to a titanium-containing silicate aerogel.

In another aspect the honeycomb matrix is first soaked in an acidic solution to convert said sodium silicate waterglass to a silicate hydrogel and thereafter soaked in a titanium salt bath to form the titanium-containing silicate hydrogel.

In yet, another embodiment the matrix is soaked in an acidic solution of a titanium inorganic salt and an aluminum inorganic salt to form, after washing and drying, a titanium- and aluminum-containing aerogel.

The finished humidity exchanger medium exhibits improved moisture absorption, improved mechanical strength and requires reduced energy to regenerate the humidified absorbent matrix.

BRIEF DESCRIPTION OF THE DRAWINGS

In the drawings like parts are designated by like reference numerals throughout the views presented.

DETAILED DESCRIPTION OF THE PREFERRED EMBODIMENTS

Figure 1:
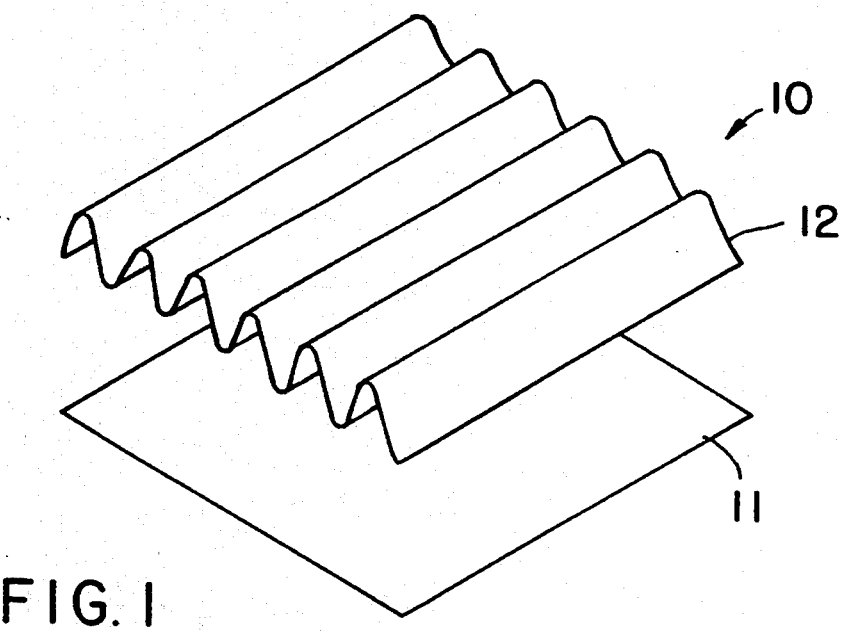
FIG. 1 is a perspective view showing the sheets of an element for a humidity exchanger.

As illustrated in FIG. 1 an element 10 for a humidity exchanger includes a flat sheet 11 and a corrugated sheet 12. The corrugated sheet generally has a flute (or wave) height from about 1 to 2.6 mm, a flute (or pitch) length of about 2.5 to 4.2 mm and a ratio of flute height/flute pitch (or aspect ratio) from about 0.2 to 2.0.

The sheets are each formed from porous papers made from about 70–100%, preferably about 90%, heat resistant inorganic fibers having a fiber diameter of about 3 to 15 microns. Typical heat resistant fibers include ceramic fiber, slag fiber, carbon fiber and, especially, glass fiber. In addition, the paper may contain up to about 20% natural or synthetic binders, such as organic pulp. Preferably, less than about 11% pulp, such as wood pulp, vegetable pulp, synthetic pulp or mixtures thereof is employed.

The sheets are each generally from about 0.1 to 0.4 mm, preferably 0.17 to 0.18 mm, in thickness. Each sheet typically has a bulk density of usually not more than 100 g/m$^2$, preferably not more than 35 g/m$^2$.

Figure 2:
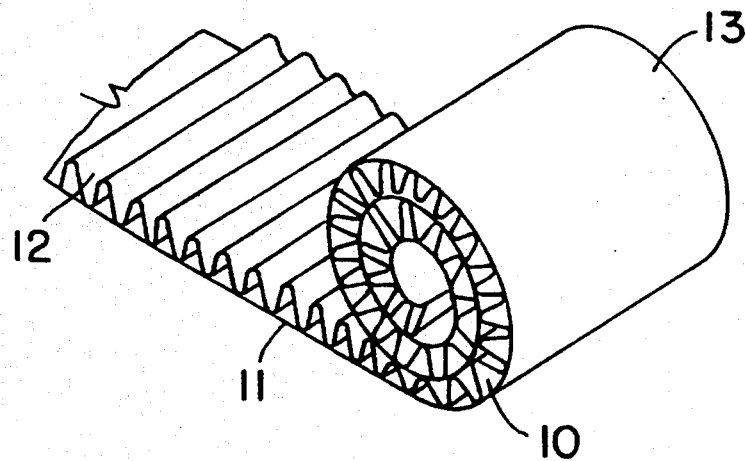
FIG. 2 is a perspective view of an element for a humidity exchanger formed into a honeycomb matrix by spirally winding the element which is composed of a corrugated sheet and a flat sheet.
Figure 3:
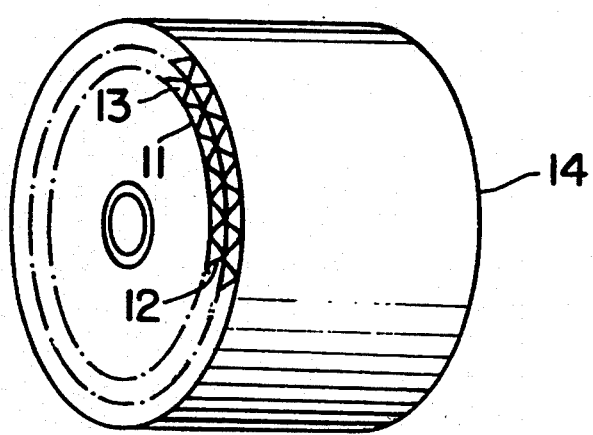
FIG. 3 is a perspective view of a rotary-type honeycomb humidity exchanger employing the spirally wound element of FIG. 2.
Figure 4:
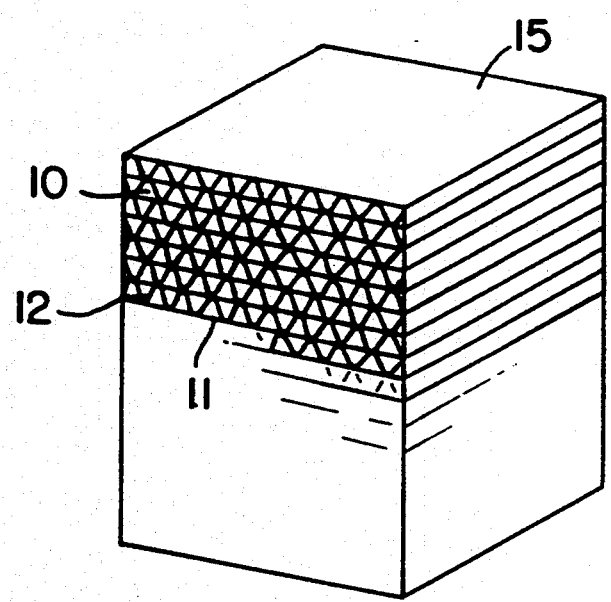
FIG. 4 is a perspective view of a parallel flow-type honeycomb block humidity exchanger.

The corrugated and flat sheets are alternately bonded together with an adhesive, preferably partially dried waterglass, so that the ridges of the corrugated paper 12 adhere to the flat liner paper 11 to obtain a single-faced corrugated paper 10, as illustrated in FIGS. 1 and 2, from about 50 to 600 mm wide. As shown in FIG. 2 the single-faced corrugated paper 10 is wound around a shaft or the like to form a cylindrical honeycomb matrix 14 as illustrated in FIG. 3. Alternatively, corrugated paper elements 10 can be stacked to form a honeycomb block matrix as shown in FIG. 4.

It is preferable to impregnate the paper with a sodium silicate waterglass as the adhesive and to employ a paper having less than about 11% organics content. The waterglass is converted into a titanium silicate or titanium-aluminum silicate aerogel as the active absorbent material for the humidity exchanger.

It is not necessary to heat the honeycomb matrix at elevated temperatures (on the order of 400°–600° C.) to remove the organic materials (i.e., adhesive and/or pulp) prior to use. By employing less than about 10% organics in the paper fibers and no organic adhesives, it is possible to use the honeycomb structure as a humidity exchanger without burning off the remaining organics. The humidity exchanger medium of the present invention can be regenerated at relatively low temperatures, usually from 60° to 175° C., using less energy than with typical humidity exchanging materials. Due to the low final organic content of the instant humidity exhange material and the low regeneration temperatures, there is no real risk of either self-supporting combustion or excessive smoke generation as is present in conventional humidity exchange materials.

The impregnated paper is then partially dried to enhance the adhesion of the sheets, to reduce the amount of shrinkage of the flute during subsequent gel formation and to ultimately provide the structure with more uniformity as a humidity exhange element.

The honeycomb matrix of sheets containing partially dried waterglass can be converted to a highly efficient absorbent by soaking the honeycomb in an acidic solution of soluble titanium salts to form a titanium silicate hydrogel which is then washed and dried to form a titanium silicate aerogel.

Alternatively, the honeycomb is soaked in an acid bath to form a silica hydrogel. The gel matrix is then soaked in a bath of titanium salts to cause titanium to migrate into the hydrogel. The hydrogel is then washed and dried to form an aerogel.

Aluminum salts may be present either in the acidic solution of titanium salts or in the bath of titanium salts in order to incorporate aluminum in the aerogel.

The dried titanium silicate aerogel contains preferably from about 1 to 3% titanium, as titanium dioxide, and from 95 to 97% silicon oxide. In another embodiment the aerogel is preferably formed from about 1 to 3% titanium, as titanium dioxide, 2 to 5% aluminum, as alumina, and 92 to 96% silicon dioxide.

The dried honeycomb matrix is machined to the desired dimensions. A tough coating of melamine, latex, nylon, TEFLON® brand polytetrafluoroethylene, colloidal silica, phenolic resins, or the like may be applied to the outer sides of the honeycomb matrix and cured to effectively increase abrasion resistance and to add strength to the structure.

The presence of titanium in the silicate or alumina silicate gel matrix has been found to improve moisture absorption and to reduce the energy required to regenerate the matrix after use. In general, the moisture absorption of the gel matrix can be enhanced on the order of up to about 20% by utilizing titanium in the gel. The energy required to regenerate the matrix can also be reduced in the order of 5 to 10% by employing titanium in the matrix.

In addition, the inclusion of titanium in the matrix serves to enhance the mechanical strength of the humidity exchanger. Tests have shown that mechanical strength, as reflected by crush strength may be increased on the order of 38%.

In one embodiment a humidity exchanger element is manufactured by impregnating paper of primarily inorganic fibers, preferably greater than 89% inorganic fibers, and, especially, fiberglass fibers, continuously with sodium silicate waterglass (37.6% solids, 3.22 $SiO_2/Na_2O$). The paper may be passed through a waterglass bath to impregnate the sheets. The waterglass adhesive has a high chemical affinity for the fiberglass-paper and moistens the surface of the composite sheets and also the apertures between the fibers. If desired, the waterglass is transferred to the paper via a print roll.

Preferably, the paper is impregnated with waterglass to a solids content on the order of 180 g/m$^2$ dry weight (480 g/m$^2$ wet weight). Thereafter, two coated sheets are partially dried in a pair of drying tunnels to the desired solids content. One sheet is passed through a pair of corrugated rollers with teeth to make flutes having a height of about 2 mm, a pitch of about 3.3 mm and a ratio of height/pitch of about 0.61. The fluted sheet is adhered to the flat sheet to form the sheets into a composite.

A series of fluted composites are stacked to form a block 15 as shown in FIG. 4. Alternatively, a fluted composite is wound around a shaft in the form of a wheel 14 as shown in FIG. 3.

In order to form the aerogel absorbent from waterglass, the composite fluted sheet structure 14 or 15 is dipped into an acid bath containing titanium salts at an elevated temperature. In general, concentrated sulfuric acid and titanium sulfate salts are employed to form the acid bath. The waterglass and acidified titanium salts react to form a titanium silicate hydrogel on the sheets. Sodium sulfate, a by-product, excess titanium sulfate and titanium silicate hydrogel not supported in the paper are then removed by washing. By heating and drying the honeycomb matrix, the main constituent thereof, a titanium silicate aerogel, is obtained.

It has been found that to form a satisfactory gel matrix from the waterglass impregnated matrix, the temperature of the acid bath and the pH of the bath are important interrelated factors which should be considered together. For the above and other purposes, the temperature of the bath is generally controlled to be from 20° to 60° C., preferably from 35° to 45° C. In general, the reaction time is from 20 minutes to 90 minutes. The pH is generally controlled from about 0.5 to 3, preferably from about 1.5 to 2.5, during the reaction.

During the gelling reaction, the pH of the acid bath tends to rise as the acid is neutralized by the high pH waterglass. To keep a constant pH, additional concentrated acid may be added.

The particular temperature of the bath and pH of the bath are selected depending on the water content of the sheets, the desired gel pore size, the gel pore volume distribution and the gel matrix strength desired. The presence of the concentrated acid causes the pores to form in the gel matrix and effects their distribution.

If aluminum salts are employed, their presence tends to stabilize the walls of the pores and enhances the long term stability of the gel. Although the literature reports that the presence of aluminum may enhance the efficiency or performance of the gel, this has not been unequivocally demonstrated.

The concentration of titanium salts in the bath may be varied preferably from greater than about 1 wt. % to the solubility limit.

It has been found useful to circulate the acid solution through the gel matrix for at least about 15 minutes by evenly raising and lowering the honeycomb matrix from the bath. If desired, the acid solution may be pumped through the matrix honeycomb instead of raising and lowering the matrix.

Rather than employing an acid bath, an acid solution can be circulated through the honeycomb. Optionally, the honeycomb may be passed under an acid waterfall to form the hydrogel.

If desired, the hydrogel may be formed by first dipping the honeycomb into concentrated sulfuric acid. Thereafter, the honeycomb can be dipped into a titanium sulfate solution to incorporate titanium into the hydrogel.

In general, concentrated sulfuric acid is preferred as the acid. However, nitric, phosphoric or hydrochloric acid may be employed. Depending on the acid selected, titanium and aluminum sulfates, nitrates, phosphates or chlorides are employed to incorporate titanium or titanium and aluminum in the gel.

Aluminum may be incorporated in the gel structure by adding an aluminum salt to the acidified titanium salt bath or by dipping the hydrogel into a solution of titanium and aluminum salts.

The pore size in the gel matrix is selected depending on the specific conditions to be met by the humidity exchanger medium. If a uniform pore size is desired, then the pH of the acid bath is maintained at a constant value. If a variation in pore size is desired, then pH is adjusted appropriately. For example, at a gas inlet side of the humidity exchanger medium the size of the pores may be tailored to pick up water under cool, damp conditions. Larger sized pores are effective for this purpose. At the outlet side of the heat exchanger the size of the pores can be tailored to effectively remove water from a hot and dry environment by forming smaller sized pores.

As noted above, pore size is controlled, in part, by the pH of the acid bath, as well as by the bath temperature. Accordingly, by varying the pH of the bath, the pore size can be made larger or smaller, as required. The pore size distribution of the aerogel can be controlled by maintaining the pH of the acidic solution from 0.5 to 1.5 on one side of the matrix to obtain smaller pores and by maintaining the pH on the other side of the matrix from 1.5 to 3.0 to obtain larger pores.

The maximum concentration of sodium salt formed from the waterglass as a by-product in the acid bath is preferably controlled to permit at least several honeycomb matrices to be processed in a single acid bath.

After the honeycomb matrix has been converted to a hydrogel, it is washed to remove by-products and excess reactants. Thereafter, the honeycomb is dried with air at appropriate flow rates and air temperatures to form an aerogel. The temperature and flow rates employed for this purpose are not critical. In general, an air temperature of about 175° C. and a flow rate of 200 feet per minute are satisfactory.

It has been noted that during gel formation the flute heights may decrease on the order of up to about 15%, from about 2 mm to about 1.7 mm. The step of partially drying the coated sheets, after impregnation with waterglass and before gel formation, reduces the net amount of such flute shrinkage and provides a more uniform structure for the humidity exchanger element.

The following Example illustrates a preferred embodiment of the present invention and does not limit its scope.

EXAMPLE 1

In order to illustrate the improved moisture absorption and mechanical strength of an element of the invention, samples of absorbent were formed from fiberglass paper having a bulk density of 35 g/m$^2$ and an organic content of <11%. The samples were impregnated with waterglass (37.6% solids, 3.22 $SiO_2/Na_2O$)) to 180 g/m$^2$ dry weight, partially dried to 55 wt. % solids, and reacted with a solution of titanium sulfate, sulfuric acid and aluminum sulfate at a pH of 1.5 for 30 minutes at a bath temperature of 43° C. The samples were washed and dried to form a titanium silicate aerogel (hereafter TiGel).

For comparison purposes samples were prepared of an alumina silicate aerogel (3–5% $Al_2O_3$, 95–97% $SiO_2$) prepared from an identical waterglass-impregnated fiberglass which was reacted at 45° C. at a pH of 1.5 for 1 hour with aluminum sulfate and sulfuric acid solution. The samples were then washed and dried (hereafter referred to as SiGel). All the samples were then processed into dehumidifier wheels.

Sample wheels of the inventive absorbent (TiGel) and of the comparative alumina silicate absorbent (SiGel) were first regenerated to equilibrium at 220° F., 80 gr/lb. and subjected to an air stream at standard temperature (20° C.) and humidity conditions (50% RH) for the same periods of time.

The net weight gain of the samples were measured. The moisture pick up was measured at 3, 4, 5, 6, 10 and 15 minute intervals. The results are found in Table 1 below:

TABLE 1

|  | TiGel (invention) |  | (Prior Art) SiGel |  |
|---|---|---|---|---|
| Sample volume (cu. in.) | 24.75 |  | 25.97 |  |
| desiccant (lb./cu. in.) | 12.6 |  | 11.1 |  |
|  | Minutes |  | Minutes |  |
| Moisture pickup (% desiccant wt.) | 3 | 5.1 | 3 | 4.6 |
|  | 4 | 6.6 | 4 | 6.0 |
|  | 5 | 8.0 | 5 | 7.2 |
|  | 6 | 9.3 | 6 | 8.5 |
|  | 10 | 14.2 | 10 | 13.3 |
|  | 15 | 19.0 | 15 | 17.0 |
| Moisture pickup (lb. $H_2O$/cu. ft.) | 3 | 0.62 | 3 | 0.51 |
|  | 4 | 0.79 | 4 | 0.66 |
|  | 5 | 0.95 | 5 | 0.81 |
|  | 6 | 1.11 | 6 | 0.94 |
|  | 10 | 1.70 | 10 | 1.48 |
|  | 15 | 2.27 | 15 | 1.89 |

The inventive dehumidifier wheels of titanium silicate aerogel exhibited higher moisture pickup than conventional alumina silicate aerogel wheels.

Samples from each absorbent were tested for mechanical strength. The force required to crush a fluted sheet flat as applied by a piston was measured in 5 places on each sample. The TiGel samples exhibited a crush strength of 36±4 psi, while the SiGel samples exhibited a crush strength of only 26±3 psi. The reason for the improved strength of the titanium silicate elements is not, as yet, understood.

Other embodiments will be obvious to those of ordinary skill in this art. This invention is not to be limited except as set forth in the following claims.

What is claimed is:

1. A method for making a humidity exchanger medium comprising:
   (a) forming a laminate of (i) a corrugated sheet and (ii) a flat sheet bonded to points of contact of a ridged surface of said corrugated sheet, said laminate having been impregnated with sodium silicate waterglass and then partially dried, each said corrugated and flat sheet comprising of a paper of inorganic fibers;
   (b) forming a honeycomb matrix from at least one said laminate;
   (c) soaking said honeycomb matrix in an acidic solution containing at least a titanium inorganic salt to convert said sodium silicate waterglass to a titanium-containing silicate hydrogel; and
   (d) washing and drying said honeycomb matrix to convert the titanium-containing silicate hydrogel to a titanium-containing silicate aerogel.

2. The method of claim 1, wherein the honeycomb matrix is first soaked in an acidic solution to convert the sodium silicate waterglass to a silicate hydrogel and thereafter soaked in a titanium salt bath to form the titanium-containing silicate hydrogel.

3. The method of claim 1, wherein the honeycomb matrix is soaked in an acidic solution of a titanium inorganic salt and an aluminum inorganic salt to form, after said washing and drying step, a titanium- and aluminum-containing silicate aerogel.

4. The method of claim 1, wherein said acidic solution is maintained at a temperature from 20° to 60° C.

5. The method of claim 1, wherein said acidic solution is maintained at a temperature from 35° to 45° C.

6. The method of claim 1, wherein said acidic solution is maintained at a pH from about 1.5 to 2.5.

7. The method of claim 1, wherein said acidic solution is maintained at a pH from about 0.5 to 3.

8. The method of claim 7 wherein the pH is maintained at a constant value to form a humidity exhanger medium having uniform pore sizes.

9. The method of claim 7 wherein pore size distribution of the aerogel is varied by maintaining the pH of the acidic solution at a value from about 0.5 to 1.5 on a first side of the honeycomb matrix and at a value from about 1.5 to 3.0 on a second side of the honeycomb matrix to provide a humidity exchanger medium with different pore sizes at opposite sides.

10. The method of claim 1, wherein said matrix is soaked in said acidic solution to convert said waterglass to said titanium-containing silicate hydrogel from about 20 minutes to 90 minutes.

11. The method of claim 1, including circulating said acidic solution through said matrix for at least about 15 minutes.

12. The method of claim 11, wherein the acidic solution is circulated by raising and lowering the honeycomb matrix from a bath containing the acidic solution.

13. The method of claim 11, wherein the acidic solution is circulated by pumping the acidic solution through the honeycomb matrix.

14. The method of claim 1 in which said paper is conducted through a waterglass bath to impregnate said paper with said waterglass.

* * * * *